(12) United States Patent
Jordan

(10) Patent No.: US 9,098,139 B2
(45) Date of Patent: Aug. 4, 2015

(54) SENSING AND DEFINING AN INPUT OBJECT

(75) Inventor: Joel Jordan, Sunnyvale, CA (US)

(73) Assignee: Synaptics Incorporated, San Jose, CA (US)

(*) Notice: Subject to any disclaimer, the term of this patent is extended or adjusted under 35 U.S.C. 154(b) by 533 days.

(21) Appl. No.: 13/588,909

(22) Filed: Aug. 17, 2012

(65) Prior Publication Data
US 2012/0310572 A1 Dec. 6, 2012

Related U.S. Application Data

(63) Continuation of application No. 12/748,001, filed on Mar. 26, 2010, now Pat. No. 8,269,511.

(60) Provisional application No. 61/240,522, filed on Sep. 8, 2009.

(51) Int. Cl.
G01R 27/26 (2006.01)
G06F 3/041 (2006.01)
G06F 3/044 (2006.01)

(52) U.S. Cl.
CPC .............. *G06F 3/0416* (2013.01); *G06F 3/044* (2013.01)

(58) Field of Classification Search
None
See application file for complete search history.

(56) References Cited

U.S. PATENT DOCUMENTS

| 8,441,450 | B2* | 5/2013 | Degner et al. ............... 345/173 |
|---|---|---|---|
| 2007/0109274 | A1 | 5/2007 | Reynolds |
| 2008/0158145 | A1 | 7/2008 | Westerman |
| 2008/0158168 | A1 | 7/2008 | Westerman et al. |
| 2008/0158169 | A1 | 7/2008 | O'Connor et al. |
| 2008/0158185 | A1 | 7/2008 | Westerman |
| 2008/0284753 | A1 | 11/2008 | Hsu et al. |
| 2009/0078476 | A1 | 3/2009 | Rimon et al. |
| 2009/0284495 | A1 | 11/2009 | Geaghan et al. |

* cited by examiner

Primary Examiner — Minh N Tang

(57) ABSTRACT

An input device comprises a display, a plurality of sensor electrodes, and a processing system. The plurality of sensor electrodes is configured to detect an input object in a sensing region of the input device. The sensing region overlaps the display. The processing system is coupled with the plurality of sensor electrodes. The processing system is configured for: acquiring a capacitive image from the plurality of sensor electrodes; and correlating a part of the capacitive image with at least one input object template image to determine a type of an input object interacting with the input device.

20 Claims, 11 Drawing Sheets

SENSING AND DEFINING AN INPUT OBJECT

CROSS REFERENCE TO RELATED U.S. APPLICATION

Continuation

This application is a continuation application of and claims the benefit of U.S. patent application Ser. No. 12/748,001 filed on Mar. 26, 2010, now U.S. Pat. No. 8,269,511, entitled "SENSING AND DEFINING AN INPUT OBJECT" by Joel Jordan, and assigned to the assignee of the present application, which is hereby incorporated by reference in its entirety herein.

It is further noted that application Ser. No. 12/748,001 claimed priority to the then provisional patent application Ser. No. 61/240,522, entitled "A CAPACITIVE TOUCH SENSOR FOR DEFINING AN INPUT OBJECT," with filing date Sep. 8, 2009, and assigned to the assignee of the present invention.

BACKGROUND

Touch sensing is a key technology in the implementation of sophisticated modern human-machine interfaces. Touch sensing can involve sensing the proximity, contact, and/or position of an object such as, for example, a human digit (i.e., a finger or thumb), stylus or other input object. Multitouch sensing can involve similar sensing with respect to multiple simultaneous input objects.

In many modern systems, touch sensing is substantially limited to sensing of human digits, as smaller objects such as a stylus cannot be adequately differentiated for treatment in a different manner. In many touch screen applications, relatively large fingers can occlude the comparatively small user interface elements that the human digits(s) are trying to interact with. Using a stylus or similar input object in such a situation would seem to resolve such a problem, as stylus input can provide higher-precision user input. However, lack of adequate or any stylus input mode is a deficiency in many common two-dimensional capacitive touch sensors. Many current stylus input solutions simply attempt to address this issue by: 1) requiring use of a an active stylus; or 2) requiring use of a stylus with a relatively fat tip to mimic a capacitive response caused by a human digit; or 3) adding additional sensor elements to the capacitive touch sensor. The first case typically involves tethered styli which adds expense, limits user input flexibility, and increases complexity of a device. The second case only substitutes a different input device which may suffer from the same problems as a human digit. The third case increases complexity/cost of the sensing region of the sensor by requiring a specialized sensor pattern to deal with a narrow stylus tip.

BRIEF DESCRIPTION OF THE DRAWINGS

The accompanying drawings, which are incorporated in and form a part of the Description of Embodiments, illustrate various embodiments of the present invention and, together with the Description of Embodiments, serve to explain principles discussed below. The drawings referred to in this Brief Description of Drawings should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

The discussion will begin with description of an example capacitive sensor device with which or upon which various embodiments described herein may be implemented. An example configuration of sensor electrodes will be described. Example capacitive images and input object template images will be described. Description will turn to use of the template images to sense and define input objects relative to a capacitance sensor device. Examples of filtering will be described. Operation of the example capacitive sensor device will then be described in more detail in conjunction with description of an example method of capacitive input object sensing and an example method of capacitive input object sensing using a mutual capacitance sensor device.

Example Sensor Device

Figure 1:
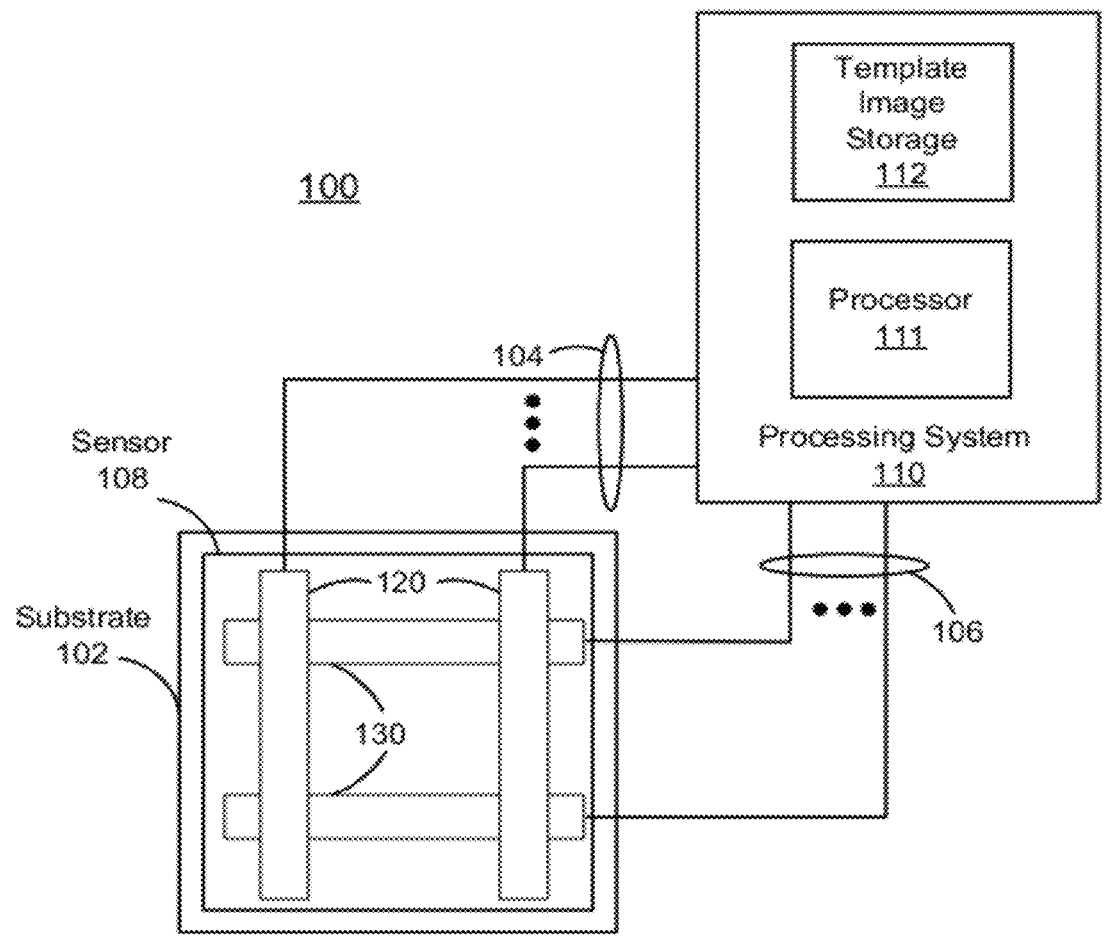
FIG. 1 is a plan view block diagram of an example capacitive sensor device that can be implemented to include one or more embodiments of the invention.

FIG. 1 is a plan view block diagram of an example capacitive sensor device 100 that can be implemented to include one or more embodiments of the present invention. As illustrated, capacitive sensor device 100 includes a sensor 108 that is disposed on a substrate 102. Sensor 108 includes two pluralities of sensor electrodes 120, 130. Although only two sensor electrodes are illustrated in each plurality (120, 130), it is appreciated that either or both can include more than two sensor electrodes. It is also appreciated that sensor electrodes 120 and sensor electrodes 130 are electrically isolated, and may be separated by a dielectric layer (not shown). One plurality of sensor electrodes (either 120 or 130) is typically used as receiver sensor electrodes while the other is used as transmitter sensor electrodes. For ease of description herein, sensor electrodes 130 will be referred to as transmitter sensor electrodes and sensor electrodes 120 will be referred to as receiver sensor electrodes. As illustrated, sensor electrodes 120, 130 are coupled to processing system 110 by conductive routing traces 104, 106. For ease of illustration and description, sensor 108 is shown with sensor electrodes 120, 130 arranged in an x/y grid, which creates capacitive pixels where capacitive coupling is measured between sensor intersections. It is appreciated, that the discussion herein is not limited to such an arrangement of sensor 108, but is instead applicable to numerous sensor electrode patterns.

Capacitive sensor device 100 can be utilized to communicate user input (e.g., using a user's finger, a probe such as a stylus, and/or some other external input object) to a computing device or other electronic device. For example, capacitive sensor device 100 can be implemented as a capacitive touch screen device that can, in some embodiments, be placed over an underlying image or an information display device (not shown). In this manner, a user would view the underlying image or information display by looking through the substantially transparent sensor electrodes (not illustrated) in sensor 108 of capacitive sensor device 100 as shown. It is noted that one or more embodiments in accordance with the present invention can be incorporated with a capacitive touch screen device similar to that of capacitive sensor device 100.

When in operation, sensor 108 is used to form a "sensing region" for sensing inputs. It is appreciated that sensor 108 typically comprises a plurality of sensor elements (e.g., the intersections of sensor electrodes 120 and 130) arranged as a sensor array to form sensor 108. "Sensing region" as used herein is intended to broadly encompass any space above, around, in and/or near the sensor device wherein the sensor is able to detect an input object. In a conventional embodiment, a sensing region, such as that formed by sensor 108, extends from a surface of the sensor device in one or more directions into space until the noise and decreased signal prevent accurate object detection. This distance may be on the order of less than a millimeter, millimeters, centimeters, or more, and may vary significantly with the type of position sensing technology used and the accuracy desired. Accordingly and as previously mentioned, the planarity, size, shape and exact locations of the particular sensing regions can vary widely from embodiment to embodiment.

Sensing regions with rectangular projected shape are common, and many other shapes are possible. For example, depending on the design of the sensor pattern and surrounding circuitry, shielding from any input objects, and the like, sensing regions can be made to have two-dimensional projections of other shapes. Similar approaches can be used to define the three-dimensional shape of the sensing region. For example, any combination of sensor design, shielding, signal manipulation, and the like can effectively define a sensing region with a distance in the third dimension.

Capacitive sensor device 100, when implemented as a touch screen, can include a substantially transparent substrate 102 having a first set of conductive routing traces 104 and a second set of conductive routing traces 106 patterned (or formed) coupled thereto. Conductive routing traces 104 and/or 106 can be utilized for coupling processing system 110 with sensor electrodes (120, 130), arrays of sensor electrodes, and/or conductive traces that form a sensor 108. Although sensor 108 is depicted as rectangular, other shapes, such as circular are anticipated. Sensor electrodes 120, 130 of sensor region 108 can be formed of a substantially transparent conductive material. Indium tin oxide (ITO) is but one example of a substantially transparent conductive material that can be used to form one or more sensor electrodes 120, 130 or conductive traces of sensor 108.

Processing system 110 drives sensor electrode(s) with a voltage and senses resulting respective charge on sensor electrode(s), to acquire one or more measurements of capacitance with respect to sensor 108. Such measurement(s) of capacitance by processing system 110 enable the sensing of contact, hovering, or other user input with respect to the sensing region formed by sensor 108. Such measurement(s) can also be utilized by processing system 110, in some embodiments, to determine positional information with respect to a user input relative to the sensing region formed by sensor 108.

In some embodiments, processing system 110 utilizes a plurality of capacitive measurements, associated with individual sensor elements (e.g., the intersections of sensor electrodes 120, 130) of sensor 108, as pixels to create a "capacitive image." In this manner, processing system 110 can capture a capacitive image that is a snapshot of the response measured in relation to an input object or objects in the sensing region of sensor 108. Capacitive pixels and images are discussed further below.

Processing system 110 may be implemented as one or more integrated circuits and/or discrete components. In one embodiment, processing system 110 includes or is implemented within an application specific integrated circuit (ASIC). In accordance with the embodiments described herein, such an ASIC can include components such as processor 111 and/or embedded logic instructions for performing capacitance measurement(s) and determining contact and/or positional information with respect a sensing region of sensor 108. In one embodiment, processing system 110 includes template image storage 112, which is a memory storage area for storing input object template images (described further below). It is appreciated that processor 111 and/or template image storage 112 may be implemented as separate components or integrated as components within the previously described ASIC.

The positional information determined by processing system 110 can be any suitable indicia of object presence. For example, the processing system can be implemented to determine "zero-dimensional" 1-bit positional information (e.g., near/far or contact/no contact) or "one-dimensional" positional information as a scalar (e.g., position or motion along a sensing region). Processing system 110 can also be implemented to determine multi-dimensional positional information as a combination of values (e.g., two-dimensional horizontal/vertical axes, three-dimensional horizontal/vertical/depth axes, angular/radial axes, or any other combination of axes that span multiple dimensions), and the like. Processing system 110 can also be implemented to determine information about time or history. The information acquired by processing system 110 from sensor 108 can be processed, filtered, and or compared/correlated with stored input object template images (as described herein) to determine positional information of an input object with respect to sensor 108 and to define the type of input object that is being sensed (i.e., human digit, stylus, contacting, hovering).

Furthermore, the term "positional information" as used herein is intended to broadly encompass absolute and relative position-type information, and also other types of spatial-domain information such as velocity, acceleration, and the like, including measurement of motion in one or more directions. Various forms of positional information may also include time history components, as in the case of gesture recognition and the like. The positional information from the processing system 110 facilitates a full range of interface inputs, including use of the proximity sensor device as a pointing device for cursor control, scrolling, and other functions.

Although described above with respect to a touch screen, capacitive sensor device 100 can also be implemented as a capacitive touchpad, slider, button or other capacitance sensor. For example, substrate 102 of capacitive sensor device 100 can be implemented with, but is not limited to, one or more clear or opaque materials that are utilized as a substrate for a capacitance sensor. Likewise, clear or opaque conductive materials can also be utilized to form sensor electrodes in sensor 108.

As previously described, many current stylus solutions attempt to make the stylus appear as a human digit to the capacitive touch sensor by either using a stylus with a relatively fat tip or by adding additional sensor elements to the capacitive touch sensor. Embodiments of the present invention allow a stylus with a relatively small tip to be used with existing conventional sensors. Moreover, embodiments of the present invention allow for using conventional sensors with either a human digit or a stylus as an input, as the stylus can be distinguished when it is used. Such embodiments allow devices which use capacitive sensing for user input to support different modes for human digit input and stylus input. Disambiguation between hovering human digits, contacting styli, and contacting human digits can be performed by the capacitive touch sensor alone (in processing system 110), and doesn't require any additional sensor elements or modification to existing sensors.

With continued reference to FIG. 1, various embodiments can utilize transcapacitive sensing methods based on the capacitive coupling between transmitter sensor electrodes 130 and receiver sensor electrodes 120. Transcapacitive sensing methods are sometimes also referred to as "mutual capacitance sensing methods." In one embodiment, a transcapacitive sensing method operates by detecting the electric field coupling one or more transmitter sensor electrodes (which are transmitting a signal) with one or more receiver sensor electrodes. Proximate objects may cause changes in the electric field, and produce detectable changes in the transcapacitive coupling. As previously described, sensor electrodes may transmit as well as receive, either simultaneously or in a time multiplexed manner. Sensor electrodes that transmit (e.g., sensor electrodes 130) are sometimes referred to as the "transmitting sensor electrodes," "driving sensor electrodes," "transmitters," or "drivers"—at least for the duration when they are transmitting. Other names may also be used, including contractions or combinations of the earlier names (e.g., "driving electrodes" and "driver electrodes." Sensor electrodes that receive (e.g., sensor electrodes 120) are sometimes referred to as "receiving sensor electrodes," "receiver electrodes," or "receivers"—at least for the duration when they are receiving. Similarly, other names may also be used, including contractions or combinations of the earlier names.

Transcapacitive sensing schemes may detect changes in capacitive coupling between transmitter sensor electrodes 130 and receiver sensor electrodes 120 when a separate electrode (e.g., an external input object such as a human digit or a stylus) is brought near. The output of sensor 108 when employing a transcapacitive sensing scheme is often referred to as an "image" or a "capacitive image." The capacitive image includes of a plurality of pixels. Pixels of a capacitive image can be referred to as the region in which the transcapacitive coupling between transmitting sensor electrode(s) 130 and receiving sensor electrode(s) 120 can be detected, a measurement location between a transmitting sensor electrode and a receiving sensor electrode, or a meeting region between transmitter sensor electrode(s) 130 and receiver sensor electrode(s) 120.

In one embodiment, one way to estimate the size and position of an input object, such as a human digit or a stylus, is to use a maximum likelihood estimator to determine a probability that an input object is present. A description of the performance of maximum likelihood estimation appears below in conjunction with discussion of Equation 1. If the probability of a maximum likelihood estimation exceeds a predetermined threshold, it can be assumed with fairly high certainty that an input object of a particular size or type is present in the capacitive image at that location. Such likelihood tests and comparisons to threshold values are described below in conjunction with description of Equations 2-4. In various embodiments, such a predetermined threshold can be preset, such as at a factory, or dynamically set/altered based on empirical information or other input such as a user preference.

In one embodiment, an electromagnetic simulation can be used to calculate the transcapacitive image for given input object parameters. A nonlinear optimization algorithm can be then used to simulate the effect of different human digit parameters until a best statistical match for the observed noisy data can be found.

In another embodiment, the size and position of an input object can be estimated using a global search through a discretization of the parameter space. For example, instead of testing every possible human digit and stylus size, the algorithm can discriminate between a small stylus (less than 2 mm) and a human digit (greater than 6 mm). Thus, if an input object less than 2 mm is detected it can be assumed to be a stylus and if an input object of 6 mm or greater is detected it can be assumed to be a human digit. Of course, other parameters and combinations can be utilized in this manner.

Further, the x and y (the axes parallel to the sensor) candidate positions of sensed input objects can be quantized to a manageable number using the centers of the sensor pixels. If the sensor pitch (spacing between sensor electrodes) is very large, a half-pixel grid could be used for better performance. Similarly, z positions (the axis perpendicular to the sensor) can be quantized. Since the sensor response falls off rapidly as the z increases, a simple choice is $z=0$ and $z>0$. In this manner, $z=0$ indicates a contacting input object and $z>0$ indicates a hovering input object.

In some embodiments, the expected transcapacitive image is computed or measured for an input object (human digit or stylus) at some or all points in the finite parameter space associated with a sensor 108. Since the transcapacitive response falls off very quickly, these transcapacitive images will only have a small area of pixels above the baseline. "Baseline," as used herein, represents a normal static response level that exists in a transcapacitive sensor even when no input object is present. These smaller images can be considered input object template images for sensing and defining input objects in the capacitive image response that processing system 110 acquires from sensor 108. As will be discussed herein, these template images can be obtained for numerous input objects and can be translated around a parameter space of an image acquired with sensor 108.

Figure 2:
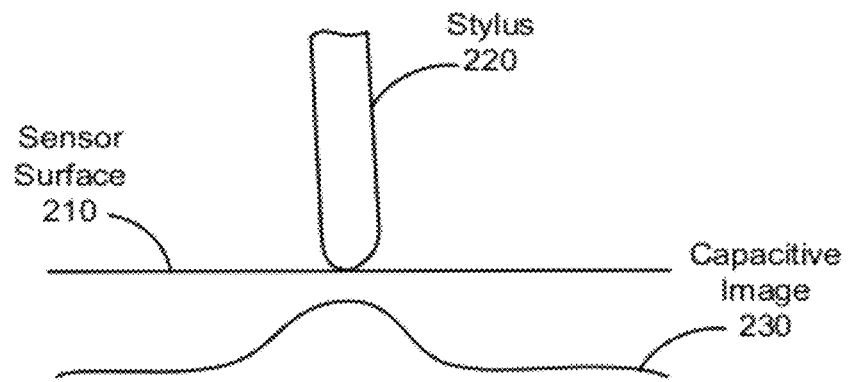
FIG. 2 illustrates an example a profile view of a capacitive image that is generated by a stylus in contact with a sensor surface, according to one embodiment.

FIG. 2 illustrates an example a profile view of a capacitive image 230 that is generated by a stylus 220 in contact with a sensor surface 210, according to one embodiment. Sensor surface 210 is an input surface located above sensor 108. As can be seen, a contacting stylus 220 produces a capacitive image 230 with a peaked response in the vicinity of contact. As previously described, the size of a stylus 220 that is to be used with sensor 108 is restricted to be a certain size, such as less than 2 mm at the tip.

Figure 3:
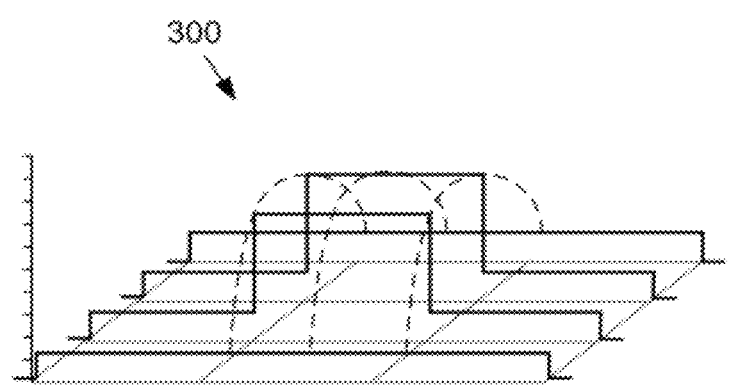
FIG. 3 illustrates an example input object template image for a stylus contacting a sensor surface, according to one embodiment.

FIG. 3 illustrates an example input object template image 300 for a stylus 220 contacting sensor surface 210, according to one embodiment. Template image 300 can be used for matching with a capacitive image 230 that results from a stylus input. It is appreciated that numerous different template images can be generated for different sizes/shapes of stylus tips that are to be utilized with sensor 108. Additional template images can be derived for detecting differently-shaped input aids (i.e., a stylus could have a small point and a rectangular eraser).

Figure 4:
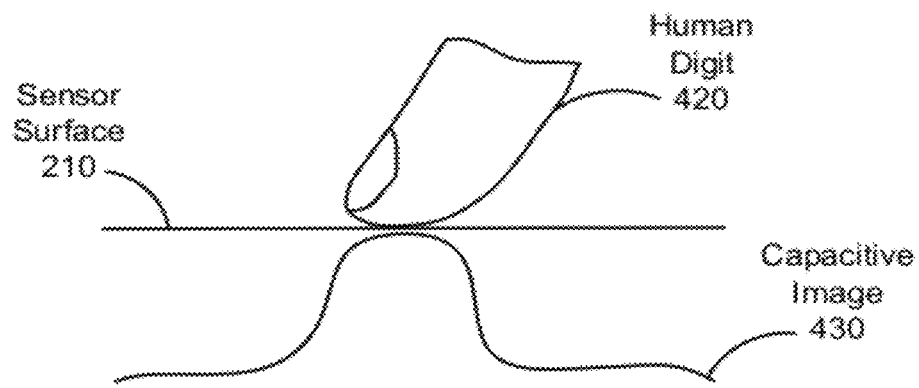
FIG. 4 illustrates an example profile view of a capacitive image that is generated by a human digit in contact with a sensor surface, according to one embodiment.

FIG. 4 illustrates an example profile view of a capacitive image 430 that is generated by a human digit 420, such as a finger or thumb, in contact with sensor surface 210, according to one embodiment. As can be seen a contacting human digit 420 produces a capacitive image 430 with a peaked response in the vicinity of contact. Capacitive image 430 is very similar in shape to capacitive image 230 produced by a contacting stylus input, but is typically of much higher amplitude. Due to signal to noise issues that can be involved when high gain is used with sensor 108 and due to restricting the size and capacitive response of a stylus 220 that is used with sensor 108, it would not be uncommon for the peak amplitude of capacitive image 230 to be one fourth or less than the amplitude of capacitive image 430.

Figure 5:
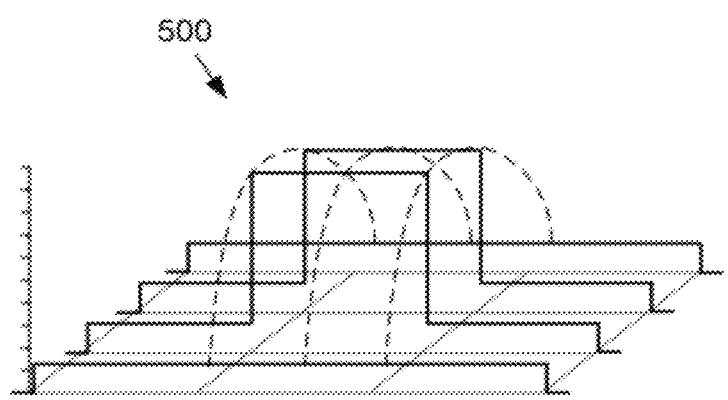
FIG. 5 illustrates an example input object template image for a human digit contacting a sensor surface, according to one embodiment.

FIG. 5 illustrates an example input object template image 500 for a human digit 420 contacting sensor surface 210, according to one embodiment. As can seen, be input object template image 500 is nearly identical to input object template image 300, with the difference being that input object template image 500 models the higher peak amplitude that is associated with a contacting human digit input. Due to this similarity, in some embodiments, the same input object template image, with sensor appropriate amplitude adjustment, can be used for sensing contacting human digits and contacting stylus.

Figure 6:
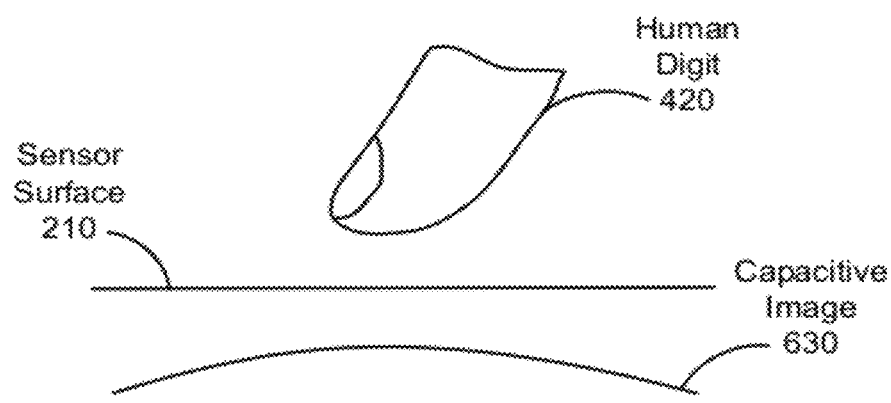
FIG. 6 illustrates an example profile view of a capacitive image that is generated by a human digit hovering above a sensor surface, according to one embodiment.

FIG. 6 illustrates an example profile view of a capacitive image 630 that is generated by a human digit 420 hovering above sensor surface 210, according to one embodiment. As can be seen, a hovering human digit 420 that comes within a range of being sensed generates a broad flat response that contrasts with and differentiates it from the peak responses of a contacting human digit or a contacting stylus.

Figure 7:
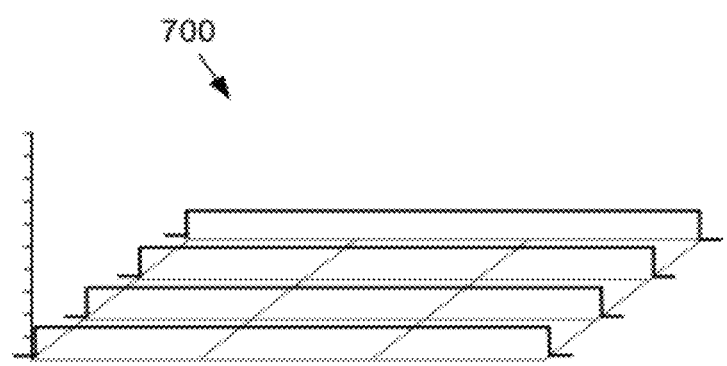
FIG. 7 illustrates an example input object template image for a human digit hovering above a sensor surface, according to one embodiment.

FIG. 7 illustrates an example input object template image 700 for a human digit 420 hovering above sensor surface 210, according to one embodiment. As can be seen there are no single peaks in this response, as it models the rather flat increase in amplitude response of pixels in a capacitive image that are near the x, y location of sensor 108 above which human digit 420 is hovering.

With reference to FIGS. 2-7, the pixels of sensor 108 that are away from the edge of the sensor 108 are all nearly identical, so they should give substantially the same response to an input object in the same relative position. Based upon the response being fairly uniform to the same input object over the entirety of sensor 108, this means that the same input object template images can be translated around, via two-dimensional convolution, and used across the entire interior of sensor 108. On the edges, truncated versions of these same input object template images can be used.

With the template images determined, a maximum likelihood estimator can be implemented by processing system 110 to correlate an acquired capacitive image (or portion thereof) with an input object template image to determine both the presence and the type of input object that is interacting with sensor 108. Processing system 110 compares the acquired capacitive images with one or more input object template images that are stored (such as in template image storage 112) in processing system 110. The input object template image with the best fit/correlation (if any) to the capacitive image data from sensor 108 is determined as the type of input object that is sensed. Maximum likelihood estimation, as described further below, can be used in determining which template image best matches an acquired capacitive image. Based on this determination, processing system 110 can utilize an input mode that is associated with the type of the input object. The input mode may be as simple as choosing either a stylus input mode or a human digit input mode, or may include choosing from input modes for different types of styli that can be recognized and/or choosing from a contacting versus hovering input mode for a sensed human digit.

Example Constraints

One or more constraints on the template images and/or the comparisons can be used. One example is constraining the number of pixels in an acquired image that are analyzed. This keeps the size of input object template images small and reduces calculations performed by processing system 110 when comparisons to the input object template images are conducted. For example, by following this constraint a template image may be restricted to a certain size, such as a 4×4 block of pixels. Another example of a constraint is filtering the acquired capacitive image, such as to remove spatially distributed noise. Yet another example of a constraint is pre-estimating the parameters of a response from sensor 108 that will exist in very low signal level detections in images that include a human digit or stylus. This is referred to herein as a "maximum likelihood estimation," and can be used to determine a response in an acquired capacitive image, or portion thereof, that exceeds a probability threshold that would indicate that there is a high likelihood of the presence of an input object being sensed at a particular position with respect to sensor 108. Maximum likelihood estimation is described in greater detail below.

When high noise is detected, the noise can be estimated and subtracted out. This will increase the number of mathematical operations, but will allow capacitive sensor device 100 to operate or to operate more robustly in detecting input objects due to the removal of noise from received signals. Further description of one technique for such noise filtering is provided below. Additionally, because processing system 110 implements an algorithm that looks for specific shapes in the transcapacitance image, it is robust to many types of baseline error. For example, smooth shifts in the baseline across the capacitive image do not interfere with the sharp stylus signal (see side profile of capacitive image 230 in FIG. 2), so styluses can still be detected.

In one embodiment, it can be assumed that the noise on each pixel is white Gaussian noise. If the sums of squares of pixel values of all the template images are normalized to equal the same constant, then the parameters that maximize the likelihood function, or probability of a match with an input object template image, are those for which a particular input object template image has the largest correlation with the acquired capacitive image. If the noise is spatially white and identically distributed across the image, a maximum likelihood can be calculated as is described below in conjunction with Equation 6.

Once the maximum correlation sum is found, a threshold is applied to it in order to determine whether there is a stylus or human digit present. The threshold can be dynamically determined based on characteristics of the measured noise, or statically set based on worst-case noise estimates.

The result is that, with suitable input object template images, processing system 110 can implement an algorithm that can distinguish reliably between small stylus tips, hovering human digits, and human digits on sensor surface 210.

With a 1-pixel (x, y) discretization grid, the correlations are equivalent to a 2-dimensional convolution of the input object template images with the baselined acquired capacitive image (s). If the input object template images are kept small and symmetric, the math required to perform the convolution can be limited.

Additional precision can be gained by interpolating the position of the peak in a capacitive image that has been correlated with an input object template image. For example, separate quadratic fits in x and y directions can be used in stylus positioning determination. Additionally, as described in conjunction with Equations 6 and 7, some techniques can be employed to deal with spatial aliasing that can occur due to possible undersampling.

Several iterations may be required to determine the best input object template image for a stylus, hovering human digit, and human digit on the surface. In one embodiment, since hovering human digits produce a broad, flat capacitance response (as shown in FIG. 2), a 4-by-4-pixel mean can be used. A stylus produces a narrow peak (as shown in FIG. 1), so its template image is a ring of small values with a 2-by-2 peak in the center. Even when the actual stylus peak is only 1 pixel, the peak in the input object template image can be set to be 2×2 pixels to carry out the interpolation.

In one embodiment, the detection of a human digit on (or near) the surface can use the same input object template image as used when detecting a stylus. A threshold is applied to an estimated amplitude of the signal to discriminate between the two cases, human digit or stylus. In another embodiment, a separate third image template can be determined and used to detect a human digit contacting (or very near) the surface.

In one embodiment, a combination of traditional detection means and comparisons against input object template images can be utilized by processing system 110. As the amplitude of a response from a touching human digit is so large, in comparison with that of a contacting stylus or a hovering human digit, processing system 110 may utilize traditional detection criteria for sensing and identifying existence of a contacting human digit and then switch to correlating portions of a capacitive image with input object template images to search for a contacting stylus or a hovering human digit in the event that a contacting human digit is not discerned by the traditional detection means.

In other embodiments, once the human digit and stylus parameters have been estimated; earlier estimates can be used to refine the current estimates. For example, operating on a single image at a time, a maximum likelihood estimator might classify the input object as a stylus in several transcapacitive images and a human digit in another transcapacitive image. Such spurious misclassification may cause capacitive sensor device 100 to improperly switch between input modes. However, the maximum likelihood estimator can use prior estimates to prevent such spurious misclassification, such as a stylus becoming a human digit and then a stylus again. Once a stylus is determined it would be possible to lock into a stylus input mode, or once a human digit is determined to be touching the sensor 108, a human digit input mode may be locked in. In other embodiments, previous estimates can be used to reject extraneous input objects, such as unintentional user interactions.

Maximum Likelihood Estimator

In order to estimate the position of an input object and determine whether it is a hovering human digit, a stylus, or a touching human digit, one of the most general approaches would be to simulate the sensor response for various digit/stylus positions and use a nonlinear optimization algorithm to find the best parameters given the data. However, computing power for performing such calculations is not typically available on the small microcontrollers and processers that are utilized with capacitive sensor devices. To work around this lack of computing power, some number M of template images can be precomputed and stored. Each template image is the capacitive image that would be produced by a human digit or stylus at some (x; y; z) position.

In one approach to detection of an input object, each frame of a captured capacitive image can be considered to be a realization of a vector random process X. The vector has one element for each pixel, and there are N pixels in an image. The detection problem is then to figure out if the realization vector X is consistent with a pen/stylus in a particular location or not.

To make analysis tractable, an assumption can be made that X is a multivariate Gaussian random process with mean vector $\mu_x$ and covariance matrix C. In a processing system 110, unless narrowband interference is present, actual experiments have shown this to be a good assumption.

If the true pen/stylus signal is s, then the expectation is that $\mu_x = s$. Therefore, the probability that the observed image x actually represents the true pen/stylus signal is represented by Equation 1.

$$P_{X|s}(x|s) = \frac{1}{2\pi \det C} \exp\left(-\frac{1}{2}(x-s)^T C^{-1}(x-s)\right) \quad (1)$$

This is called the likelihood function and can be used herein as a maximum likelihood estimator. With reference to Equation 1, variables x, s, and C represent vectors. Additionally, in Equation 1, the likelihood function is generally denoted as L(s|x), which is read as "the likelihood of s given x." In this case, for a given s, the likelihood has a Gaussian distribution.

The power of the likelihood function of Equation 1 is that if the signal s is known to be one of $s_1, s_2, \ldots, s_m$, then one of $s_1, s_2, \ldots, s_m$ can be chosen by evaluating the likelihood function for each and picking the value of s with the maximum likelihood.

Consider a binary hypothesis test case where it is desired to distinguish between two hypotheses. The first hypothesis, $H_0$, is that no pen/stylus is present. This produces signal vector 0 (that is, the N-element zero vector). The second hypothesis, $H_1$, is that there is a pen/stylus on the sensor at a known location (perhaps determined in the previous frame), producing signal vector s. Hypotheses $H_0$ and $H_1$ can be described as:

$H_0: x \sim N(0,C)$ $H_1: x \sim N(s,C)$ where the tilde is understood to mean "is distributed as" and the notation N(mu, C) means a vector Gaussian distribution with mean vector mu and covariance matrix C.

With just two hypotheses, a likelihood ratio can be computed as a statistic for deciding which hypothesis is more likely as represented in Equation 2.

$$\Lambda(x) = \frac{p_{X|H_1}(x|H_1)}{p_{X|H_0}(x|H_0)} \quad (2)$$

When applied, the likelihood ratio test compares $\Lambda(x)$ to a threshold $\eta$. Application of the likelihood ration test is described by Equation 3.

$$\Lambda(x) \underset{H_0}{\overset{H_1}{\underset{<}{>}}} \eta \quad (3)$$

In one embodiment, the threshold is determined (empirically or calculated) to balance the probabilities of false detections and missed detections.

With the hypotheses $H_0$ and $H_1$, this can be simplified by taking the log of both sides of the likelihood ratio test and canceling like terms until achieving the test represented by Equation 4.

$$x^T C^{-1} s \underset{H_0}{\overset{H_1}{\underset{<}{>}}} \ln\eta + \frac{1}{2} s^T C^{-1} s \quad (4)$$

The terms on the right side of Equation 4 are both constant and give a transformed threshold. The term on the left side of Equation 4 describes a filter to apply to the measured image in x. If the noise on the pixels of a capacitive image were uncorrelated and identically distributed, this would mean $C = \sigma^2 I$. The filter would then be $x^T s$, which calculates the correlation of x and s. Otherwise, $C^{-1}$ functions as a whitening filter. If the noise covariance C and s are known, by using this test, processing system 110 can determine whether a pen/stylus is present or not.

The previous discussion is extensible to additional hypotheses. For example, consider an embodiment where it is not already known where the pen/stylus is located. Suppose however, that it is known that the pen/stylus can only be either not present or at one of M positions, and the images $s_1, s_2, \ldots, s_m$ corresponding to each are known. The position the pen/stylus is actually located at is position n, where n=0 denotes that no pen present. In such conditions, processing system 110 can find the image $s_{n_{ML}}$ that maximizes the likelihood ratio, and this is the most probable position of the pen/stylus. In various embodiments, the case where the pen/stylus is not present in the maximization can be included or the likelihood ratio test can be applied to test $s_{n_{ML}}$ as if it were a binary hypothesis problem. This procedure is referred to as the generalized likelihood ratio test (GLRT). As in the previous description, this is equivalent to comparing $x^T C^{-1} s_{n_{ML}}$ to a threshold.

Taking the likelihood ratio from Equation 1, it follows that maximizing the likelihood ratio is equivalent to the maximization illustrated in Equation 5, where $n_{ML}$ is referred to as the maximum likelihood estimate of n.

$$\hat{n}_{ML} = \underset{i}{\mathrm{argmax}}\, x^T C^{-1} s_i \quad (5)$$

The GLRT procedure can require significant computational effort as it is predicated on beginning with a library of template images of every possible image that could be generated by the pen/stylus and then determining which template image is most correlated with the measured data. However, with a few simplifying assumptions, the GLRT procedure can be reduced to something that is computationally practical and thus possible implement in processing system 110.

A first assumption is that the response to the pen/stylus is uniform over the capacitive sensor. This just means that as the pen/stylus is translated around the sensor; thus, the response should move around with it and stay the same shape. Since the response is essentially zero a few pixels from the pen tip, due to the quick fall off of response to a pen/stylus, this allows the pen/stylus response to be modeled as a small image that gets translated around the full sensor image. This gives $s_i$ at as many discrete positions as desired.

This amounts to taking a small image, translating it around a larger image, and computing the correlation at each position. This is equivalent to a 2-dimensional convolution. By making an assumption that the sensor and pen/stylus images are not undersampled, it can be seen that it is sufficient to restrict pen/stylus positions to locations on a one-pixel grid. Neglecting edges, the Sampling Theorem implies that the correlation image produced this way has all the information of one with denser sampling.

The small image that is being translating around the larger image can be thought of as a template for the pen/stylus. It is generated by measuring the response of a real pen/stylus on a sensor. This is often referred to as a matched filter, since it matches the signal that is being search for. Using pens/styluses of different sizes template images can be determined for each pen/stylus and then used, as described above, to determine which (if any) of this limited set is present in a capacitive image.

Within the above constraints, different pen/stylus sizes can be accommodated by making the central peak of the template flatter. As the response flattens out completely, it can also be used for detecting hovering fingers. In cases where noise is spatially white and identically distributed across the image (where $C = \sigma^2 I$) maximum likelihood processing system 110 can compute maximum likelihood using Equation 6.

$$n_{ML} = \underset{i}{\mathrm{argmax}}\, x^T s_i \quad (6)$$

This is possible since the $\sigma^2$ can be incorporated into the detection threshold. If $x^T s_{n_{ML}}$ is above the detection threshold, then this procedure has located the pen to within one pixel. Away from the edges of the sensor, it is possible to interpolate the correlation image to find the pen/stylus location to sub-pixel accuracy. This is a consequence of the assumption that the image is not being undersamped.

In some instances however, the image quite likely does undersample the pen/stylus response. This undersampling can occur because the receiver sensor electrode and transmitter sensor electrode pitches are much wider than the tip of the pen. In an undersampled image, some of the high frequencies present in the pen/stylus response will alias to lower frequencies. As long as the undersampling is slight, this will only impact the highest frequencies in the sampled data. By applying a low-pass filter, represented as the linear transform H, to the sampled data and the template image, most of the aliased frequencies will be removed. The low-pass filter can be combined with the correlation operation because of the relationship shown in Equation 7.

$$(Hx)^T C^{-1} H s_i = x^T (H^T C^{-1} H s_i) \qquad (7)$$

Equation 7 shows that processing system 110 can deal with some amount of spatial aliasing, but only by throwing away potentially useful high frequency information. In practice, such problems are usually manageable even with sensor pitches more than 60% larger than the tip of a pen/stylus being used for user input.

Noise Filtering in Conjunction with Input Object Template Matching

Most noise from Liquid Crystal Displays or other electrical interference sources can be largely canceled because it is common across each row of sensor electrodes in a capacitive sensor. This is true in a transcapacitive system that samples from several receiver channels at once. The correlation occurs because external interference sources have roughly the same effect on each channel, and they're sampled simultaneously.

Even though the above description discusses recognizing only single input objects, other templates images can be derived enabling the detection of multiple inputs, including (but not limited to): multiple human digits, multiple styli and human digit and stylus combinations.

Many multi-touch transcapacitive imaging algorithms use per-pixel thresholds to determine the position of an input object. This works well for high signal-to-noise ratios, and doesn't require any assumptions about the size of input objects. However, by limiting detection to a single input object of an assumed size, such as a stylus with a tip size of a particular dimension or a human digit above a certain minimum dimension, operation can occur with a much lower signal to noise ratio. This allows the detection of the position of a hovering human digit even in a noisy environment.

In one embodiment, a filter can be used to assist in detecting a hovering human digit proximate to the touch surface of sensor 108. In one embodiment, the filter used is a two-dimensional finite impulse response (FIR) filter that is convolved with the transcapacitive image. At each pixel of the transcapacitive image, the filter output is a statistic of how likely it is that an input object, such as a hovering human digit, is present there. This is referred to as the input object statistic. Assuming that the input object is equally likely to be found in any particular point of the capacitive image, the input object can be located by finding the pixel in the image with the maximum input object statistic (assuming input objects produce positive responses). In one embodiment, processing system 110 accomplishes this noise filtering. In one embodiment, processing system 110 also compares the maximum input object statistic to a threshold before it decides that an input object is actually present.

In one embodiment, there are two components to the FIR filter. The first component, template image $s_i$, is a matched filter for finding the input object. While certain constraints can be implemented, generally the size of a human digit that may be detected is not known in advance. Thus an approximation of a pixel size which should encompass a variety of sizes of input objects can be used, such as, for example: a 5×5 pixels window. The matched filter is, in one embodiment, shaped to approximate the size of a human digit or pen/stylus response in a capacitive image. In one embodiment, techniques previously described in conjunction with Equation 5 can be utilized to estimated the location of a pen/stylus with respect to a sensor.

The second component of the FIR filter, $C^{-1}$, estimates the row unison noise to remove it. In one embodiment, an acceptable estimator is just the mean pixel response along each row of pixels. The filter computes the row means outside of the 5×5 box and subtracts it from the pixels inside of the 5×5 box.

Figure 8:
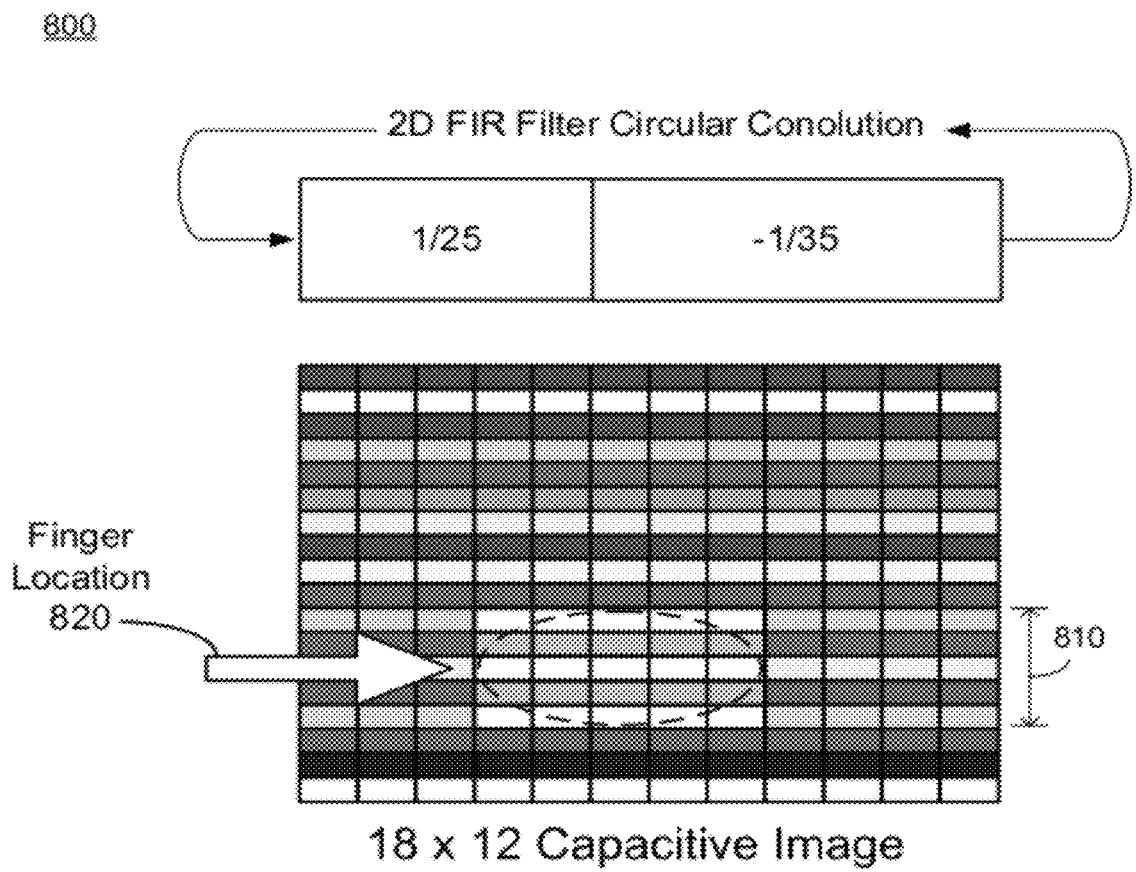
FIG. 8 illustrates an example finite impulse response filter, according to an embodiment.

FIG. 8 illustrates an example finite impulse response filter 800 in use with an 18×12 pixel capacitive image, according to an embodiment. This filter is circularly convolved with the capacitive image and thus can be shifted in x or y directions in parallel with the image. In one embodiment, the border areas where the matched filter wraps can be discarded. As can be seen, input object location 820 is located on the 5 rows of pixels encompassed by range 810. A 5×5 box identified by the arrow represents a possible input object location 820. Processing system 110 determines the mean of the response of the remaining 35 pixels in the rows located in range 810 is determined. Processing system 110 then subtracts this mean from the response of each of the 25 pixels in the 5×5 box. If an input object is not located in the remaining 35 pixels, the mean response will reduce the response of each of these 25 pixels by the amount of uniform noise that exists in the 5 rows.

If only one input object of roughly the assumed size that will fit in the 5×5 box is proximate to the sensor, then when the matched filter completely overlaps it, the remaining pixels in each row are only noise. The means along each row, away from the input object, estimate the row unison noise.

Where the matched filter is on the same row as the input object, but does not completely overlap it, the row noise means are overestimated. Thus, when the overestimated means are subtracted from the pixels under the matched filter, the input object statistic at that pixel is lower than the true value should be. However, since the input object is positioned somewhere else on the touch sensor and only the maximum value needed, no issues arise when underestimating the input object statistic where the input object is not located. Further, the noise filter will mostly ignore palms (large conductive objects) until they get very close.

Example Methods of Operation

The following discussion sets forth in detail the operation of example methods of operation of embodiments. With reference to FIGS. 9A-D and 10A-B, flow diagrams 900 and 1000 illustrate example procedures used by various embodiments. Flow diagrams 900 and 1000 include some procedures that, in various embodiments, are carried out by a processor such as an ASIC under the control of computer-readable and computer-executable instructions. In this fashion, all or part of flow diagrams 900 and/or 1000 can implemented using a computer or processing system, such as processing system 110, in various embodiments. The computer-readable and computer-executable instructions can reside in any tangible computer readable storage media, such as, for example, memory, logic, and/or silicon of processing system 110. These computer-readable and computer-executable instructions, are used to control or operate in conjunction with, for example, some portion of processing system 110, such as a processor or an ASIC.

Although specific procedures are disclosed in flow diagrams 900 and 1000, such procedures are examples. That is, embodiments are well suited to performing various other procedures or variations of the procedures recited in flow diagrams 900 and/or 1000 and described below. Likewise, in some embodiments, the procedures in flow diagrams 900 and/or 1000 may be performed in an order different than presented and/or not all of the procedures described in flow diagrams 900 and/or 1000 may be performed.

Example Method of Capacitive Input Object Sensing

FIGS. 9A-9D illustrate a flow diagram 900 of various embodiments of an example method of capacitive input object sensing. Flow diagram 900 also describes a method of using capacitive sensor device 100 and processing system 110, according to an embodiment. Procedures of flow diagram 900 are described below, with reference to elements of FIGS. 1-8.

Figure 9A:
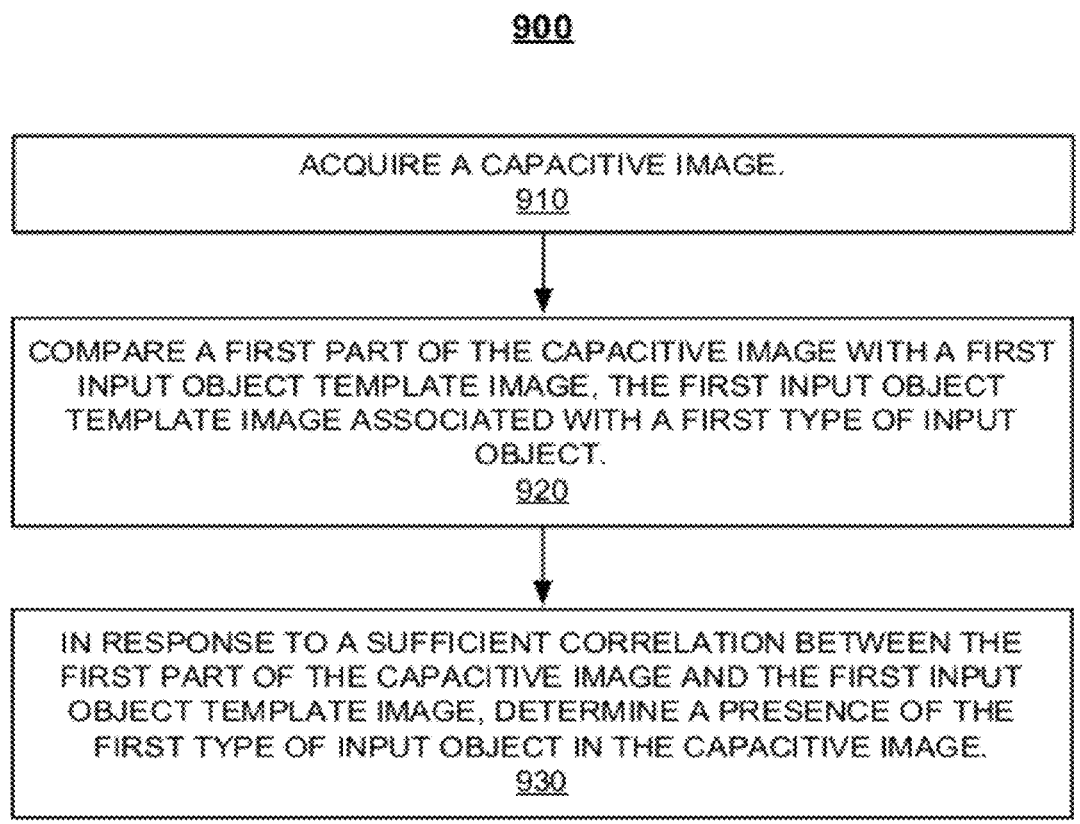
FIGS. 9A-9D illustrate a flow diagram of various embodiments of an example methods of capacitive input object sensing.

Referring now to FIG. 9A. At 910 of flow diagram 900, in one embodiment, a capacitive image is acquired. In one embodiment, this comprises processing system 110 acquiring a capacitive image from sensor 108 by conducting mutual capacitance sensing with sensor electrodes 120, 130.

At 920 of flow diagram 900, in one embodiment, a first part of the acquired capacitive image is compared with a first input object template image. The first input object template image (300, 500, 700, and the like) is associated with a first type of input object such as a contacting stylus, a contacting human digit, a hovering human digit, or the like. Thus, in one embodiment, the first input object template image is one of a hovering human digit capacitive template image, a contacting human digit capacitive template image, or a stylus capacitive template image. In one embodiment, this can comprise processing system 110 comparing a portion of the capacitive image, such as the 5×5 box of pixels shown in FIG. 8, with an input object template image that is stored in template image storage 112.

At 930 of flow diagram 900, in one embodiment, in response to a sufficient correlation between the first part of the capacitive image and the first input object template image, it is determined that first type of input object is present in the capacitive image. In one embodiment, this comprises processing system 110 determining if the comparison shows a sufficient correlation (i.e., meets/exceeds some threshold value that indicates a high probability of a match). If so, then processing system 110 determines that this portion of the capacitive image has sensed the input object that is associated with the first input object template image.

Figure 9B:
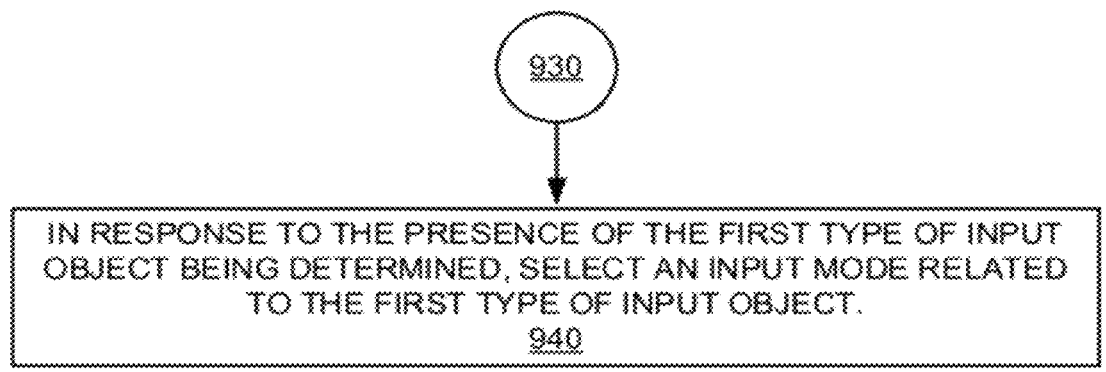

Referring now to FIG. 9B. At 940 of flow diagram 900, in one embodiment, the illustrated method further comprises selecting an input mode related to the first type of input object. This comprises processing system 110 selecting an input mode that is associated with the first type of object in response to the presence of the type of input object in the capacitive image having been determined at procedure 930.

Figure 9C:
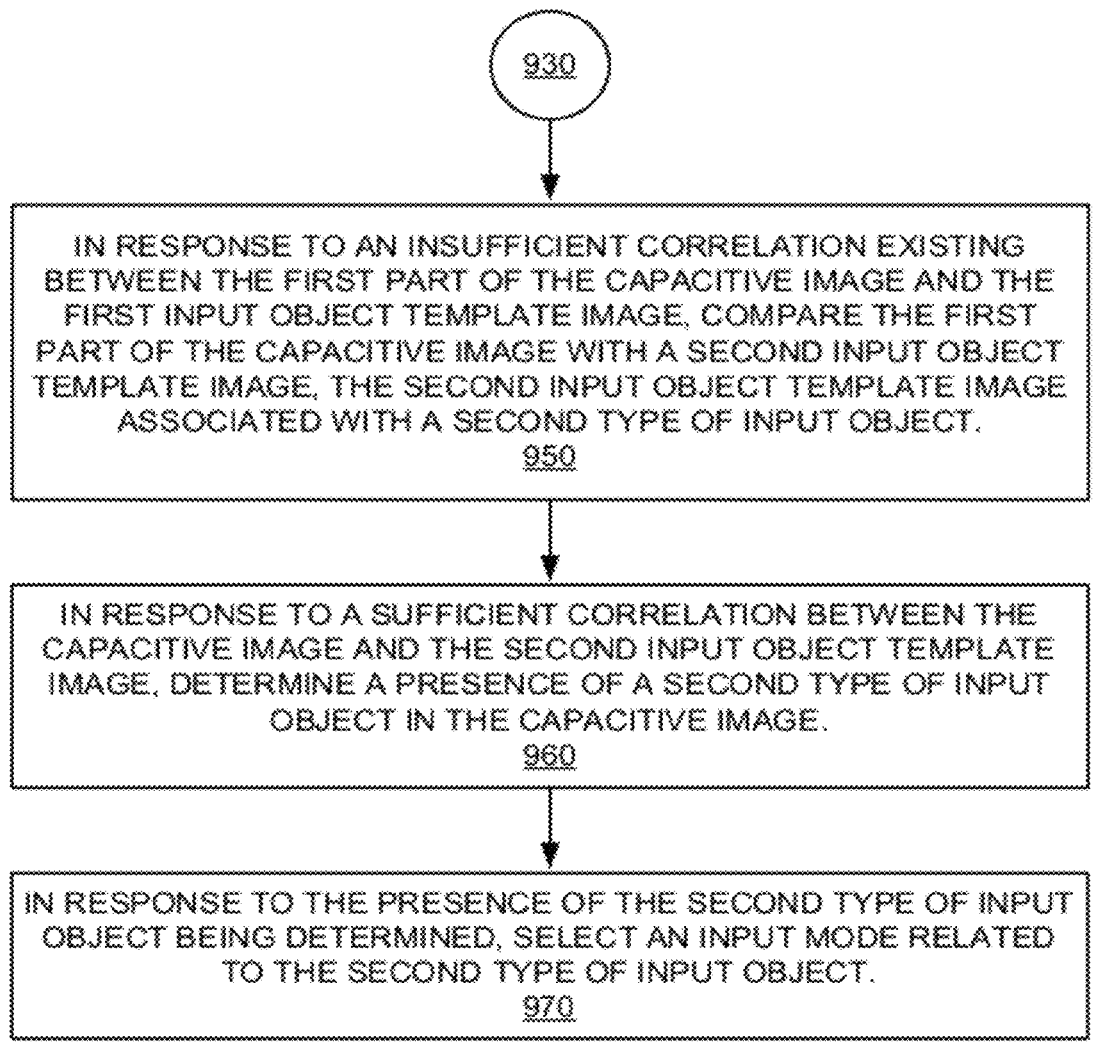

Referring now to FIG. 9C. At 950 of flow diagram 900, in one embodiment, the method illustrated by flow diagram 900 further comprises comparing the first part of the capacitive image with a second input object template image, where second input object template image is associated with a second type of input object. Processing system 110 makes this comparison, in one embodiment, if there was an insufficient correlation noted between the first part of the capacitive image and the first input object template image. This can be similarly accomplished for a third input object template image, and so on, until either a best match is found or all available input object template images have been exhausted. In one embodiment, all available template images are searched in order to find the best match. In other words, searching does not stop when a potential match is found; instead it continues through all of the available template images to ensure that the potential match is the best match from set of available template images.

At 960 of flow diagram 900, in one embodiment, the method illustrated by flow diagram 900 further comprises determining a presence of a second type of input object in the capacitive image in response to a sufficient correlation between the first part of the capacitive image and the second input object template image. In one embodiment, this comprises processing system 110 determining if the comparison shows a sufficient correlation (i.e., meets/exceeds some threshold value that indicates a high probability of a match). If so, then processing system 110 determines that this portion of the capacitive image has sensed the input object that is associated with the second input object template image.

At 970 of flow diagram 900, in one embodiment, the method illustrated by flow diagram 900 further comprises, selecting an input mode for capacitive sensor device 100 that is related to the second type of input object. In one embodiment, processing system 110 selects this input mode associated with the second type of input object in response to the presence of the second type of input object being determined based on the comparison of procedure 960.

Figure 9D:
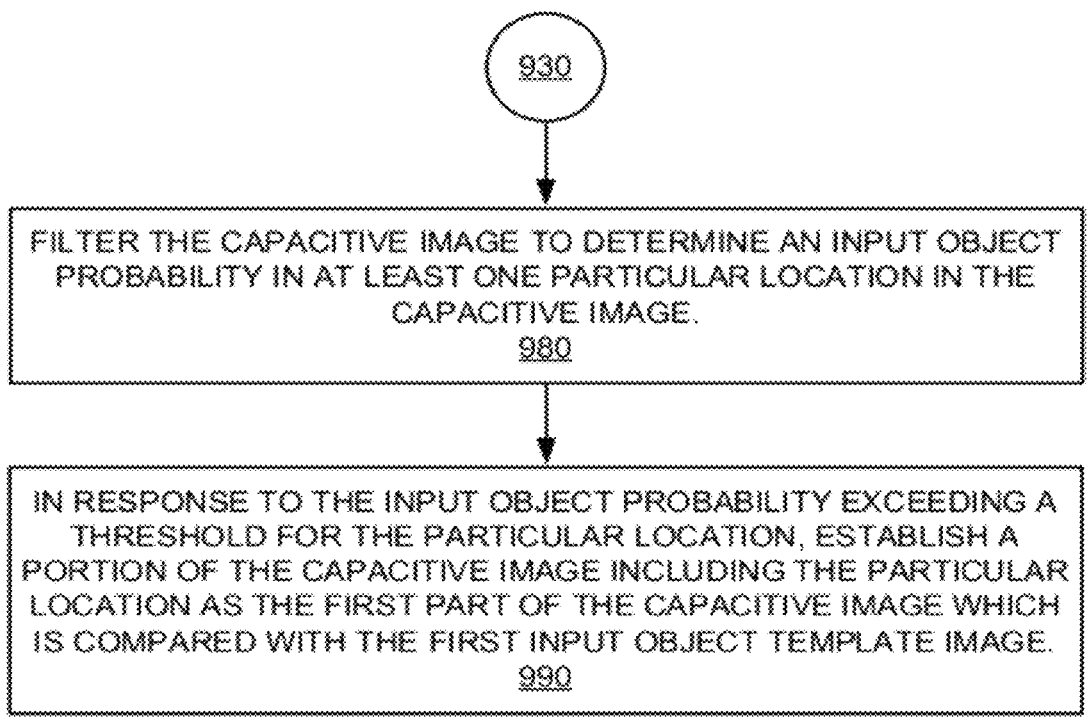

Referring now to FIG. 9D. At 980 of flow diagram 900, in one embodiment, the method illustrated by flow diagram 900 further comprises filtering the acquired capacitive image to determine an input object probability in at least one particular location in the acquired capacitive image. This can comprise processing system 110 utilizing a circularly convolved FIR filter on a portion of the acquired capacitive image (e.g., the 5×5 box shown in FIG. 8) as has been described herein. It is appreciated that the FIR filter can include both a matched filter for locating an input object and a noise filter estimating and removing (subtracting out) spatially correlated noise in the portion of the capacitive image that is being analyzed. In such an embodiment, the matched filter operates as the maximum likelihood estimator and thus, this can also comprise processing system 110 performing maximum likelihood estimation for a portion of the acquired image (e.g., the 5×5 box shown in FIG. 8), so that the input object probability at the particular location can be determined. It is appreciated that noise removal makes maximum likelihood estimation more accurate and more robust in noisy signal environments.

At 990 of flow diagram 900, in one embodiment, the method illustrated by flow diagram 900 further comprises establishing a portion of the capacitive image that includes the particular location as the first part of the capacitive image which is compared with the first input object template image. This occurs in response to the input object probability exceeding a threshold for the particular location. The threshold comprises a threshold based upon a false-detection probability relating to the first type of input object. In one embodiment, this can comprise processing system 110 establishing that the 5×5 box is a portion that should be compared with the first input object template image if it is determined that this part of the overall capacitive image exceeds a threshold that indicates a high enough likelihood that an input object has been sensed in this part of the capacitive image. The threshold can be preset or dynamically adjusted by processing system 110 based upon empirical information obtained through use of capacitive sensor device 100.

Figure 10A:
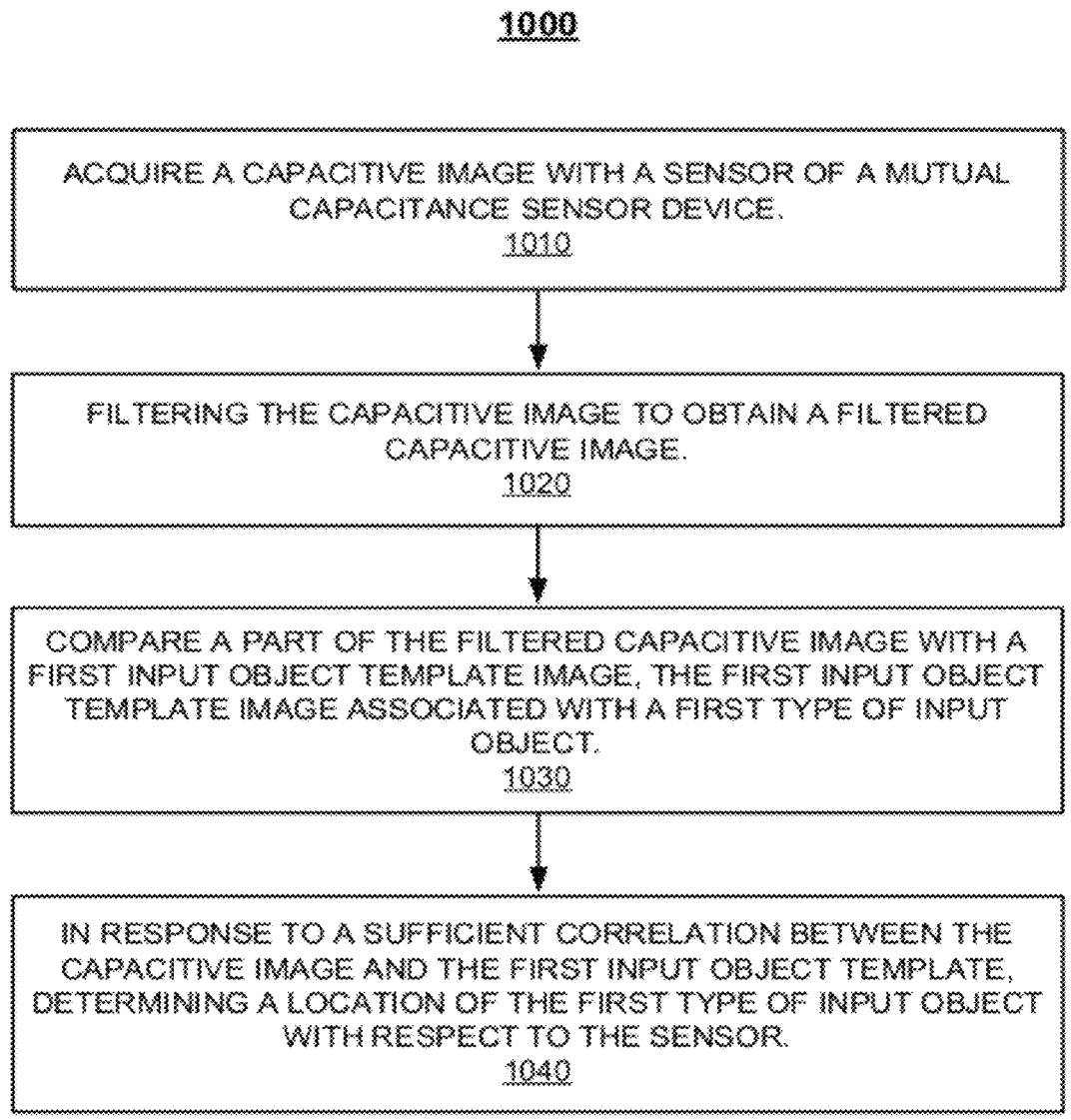
FIGS. 10A-10B illustrate a flow diagram of various embodiments of an example method of capacitive input object sensing using a mutual capacitance sensor device.
Figure 10B:
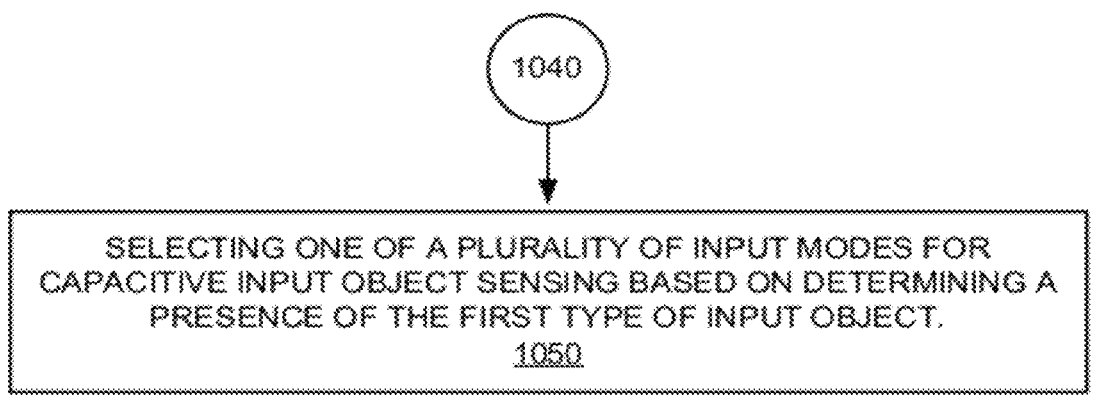

Example Method of a method of Capacitive Input Object Sensing Using a Mutual Capacitance Sensor Device FIGS. 10A and 10B illustrate a flow diagram 1000 of various embodiments of an example method of capacitive input object sensing using a mutual capacitance sensor device, according to an embodiment. Flow diagram 1000 also describes a method of using capacitive sensor device 100 and processing system 110, according to an embodiment. Procedures of flow diagram 1000 are described below, with reference to elements of FIGS. 1-8.

At 1010 of flow diagram 1000, in one embodiment, a capacitive image is acquired with a sensor of a mutual capacitance sensor device. In one embodiment, this comprises processing system 110 acquiring a capacitive image from sensor 108 through mutual capacitance sensing with sensor electrodes 120, 130.

At 1020 of flow diagram 1000, in one embodiment, the acquired capacitive image is filtered to obtain a filtered capacitive image. As described herein, this filtering can be accomplished by processing system 110. In various embodiments, this can comprise processing system employing a matched filter on the capacitive image, estimating spatially correlated noise with respect to a portion of the capacitive image, and removing the spatially correlated noise from the portion of the capacitive image that was match filtered to obtain the filtered capacitive image. Techniques for such noise estimation and removal have been described previously in conjunction with description of FIG. 8, and reference is made thereto. In one embodiment, the filtering additionally or alternatively comprises filtering the capacitive image to determine an input object probability in at least one particular location in the capacitive image (e.g., the 5×5 box shown in FIG. 8). In response to the input object probability exceeding a threshold for the particular location, in one embodiment, processing system 110 establishes that a portion of the capacitive image that includes the particular location (e.g., the 5×5 box) as the part of the capacitive image which is compared with the first input object template image.

At 1030 of flow diagram 1000, in one embodiment, a first part of the acquired and then filtered capacitive image is compared with a first input object template image. The first input object template image (300, 500, 700, and the like) is associated with a first type of input object such as a contacting stylus, a contacting human digit, a hovering human digit, or the like. Thus, in one embodiment, the first input object template image is one of a hovering human digit capacitive template image, a contacting human digit capacitive template image, or a stylus capacitive template image. In one embodiment, this can comprise processing system 110 comparing a portion of the filtered capacitive image, such as the 5×5 box of pixels shown in FIG. 8, with an input object template image that is stored in template image storage 112.

At 1040 of flow diagram 1000, in one embodiment, a location of the first type of input object with respect to the sensor (e.g., sensor 108) is determined. This is accomplished, in one embodiment, by processing system 110. For example, processing system 110 determines that this portion (e.g., the 5×5 box) of the filtered capacitive image has sensed the input object that is associated with the first input object template image. The determination can be based on the filtered image having evidenced a sufficient correlation with the first input object template to indicate a high probability of the first type of input object being sensed. In one embodiment, a sufficient correlation exists when a threshold associated with the first input object template image has been met/exceeded. If there is insufficient correlation to the first input object template image, attempted matching can continue with additional available input object template images until a sufficient correlation is achieved or the available input object template images are exhausted. As noted above, it is possible to search all templates regardless of the correlation of the "first" template searched, to determine the best match. When searching through all template images, the search can be in series (one after another) or in parallel (all template images searched at a first location) and so on.

At 1050 of flow diagram 1000, in one embodiment, the method illustrated in flow diagram 1000 further comprises selecting one of a plurality of input modes for capacitive input object sensing based on determining a presence of the first type of input object. For example, if the first input object template image was associated with a contacting human digit processing system 110 can select an input mode for a contacting human digit, or an input mode for a human digit (if the options are only stylus or human digit). In one embodiment, the input mode is selected from one of: a hovering human digit input mode, a contacting human digit input mode, and a stylus input mode.

The foregoing descriptions of specific embodiments have been presented for purposes of illustration and description. They are not intended to be exhaustive or to limit the presented technology to the precise forms disclosed, and obviously many modifications and variations are possible in light of the above teaching. The embodiments were chosen and described in order to best explain the principles of the presented technology and its practical application, to thereby enable others skilled in the art to best utilize the presented technology and various embodiments with various modifications as are suited to the particular use contemplated. It is to be understood that the appended claims are not necessarily limited to the specific features or acts described above. Rather, the specific features and acts described above are disclosed as example forms of implementing the claims and their equivalents.

What is claimed is:

1. An input device comprising:
   a display;
   a plurality of sensor electrodes configured to detect an input object in a sensing region of said input device, wherein said sensing region overlaps said display; and
   a processing system coupled with said plurality of sensor electrodes, said processing system configured for:
   acquiring a capacitive image from said plurality of sensor electrodes; and
   correlating a part of said capacitive image with at least one input object template image to determine a type of an input object interacting with said input device.

2. The input device of claim 1, wherein said processing system comprises an input object template image storage component in which said at least one input object template image is stored, wherein said at least one input object template image is associated with at least one type of input object.

3. The input device of claim 1, wherein said processing system is further configured for:
   selecting one of a plurality of input modes based on said determination of said type of said input object.

4. The input device of claim 1, wherein said processing system is further configured for:
   filtering said capacitive image to determine an input object presence probability in at least one particular location in said capacitive image.

5. The input device of claim 4, wherein said processing system is further configured for:
   establishing a portion of said capacitive image, including said at least one particular location, as a first part of said sensing region in response to said input object presence probability exceeding a threshold.

6. The input device of claim 4, wherein said filtering said capacitive image to determine an input object presence probability in at least one particular location in said capacitive image comprises:
estimating spatially correlated noise with respect to said capacitive image; and
removing said spatially correlated noise from said capacitive image.

7. The input device of claim 1, wherein said correlating a part of said capacitive image with at least one input object template image to determine a type of an input object interacting with said input device comprises:
in response to an input object presence probability exceeding a threshold in at least one particular location in said capacitive image, utilizing said input object template image to determine said type of said input object.

8. The input device of claim 1, wherein said at least one input object template image is selected from the group of input object template images consisting of: a hovering human digit capacitive image, a contacting human digit capacitive image and a stylus capacitive image.

9. A method of capacitive input object sensing, said method comprising:
acquiring a capacitive image;
comparing a first part of said capacitive image with a first input object template image, said first input object template image associated with a first type of input object;
comparing said first part of said capacitive image with a second input object template image, said second input object template image associated with a second type of input object; and
in response to a sufficient correlation between said first part of said capacitive image and one of said first and second input object template images, determining a type of input object in said capacitive image.

10. The method as recited in claim 9, further comprising:
in response to an insufficient correlation existing between said first part of said capacitive image and said first and second input object template images, comparing a second part of said capacitive image with said first and second input object template images; and
in response to a sufficient correlation between said second part of said capacitive image and one of said first and second input object template images:
determining a type of input object in said capacitive image; and
selecting an input mode related to said type of input object.

11. The method as recited in claim 9, further comprising:
filtering said capacitive image to determine an input object presence probability in at least one particular location in said capacitive image; and
in response to said input object presence probability exceeding a threshold for said particular location, establishing a portion of said capacitive image, including said particular location, as said first part of said capacitive image.

12. The method as recited in claim 11, wherein said filtering said capacitive image to determine an input object presence probability in at least one particular location in said capacitive image comprises:
employing a matched filter on a portion of said capacitive image, said portion including said particular location;
estimating spatially correlated noise with respect to said portion of said capacitive image; and
removing said spatially correlated noise from said portion of said capacitive image to compute said input object presence probability at said particular location.

13. The method as recited in claim 11, wherein said threshold comprises a threshold based upon a false-detection probability relating to said input object.

14. The method as recited in claim 9, wherein said first and second input object templates image are selected from the group of input object template images consisting of: a hovering human digit capacitive template image, a contacting human digit capacitive template image, and a stylus capacitive template image.

15. A processing system for a capacitive input device object sensing using a mutual capacitance sensor device, said processing system comprising:
memory configured to store a plurality of input object template images, wherein the processing system is configured to:
acquire a capacitive image with a sensor of said capacitive input device;
compare a part of said capacitive image with a first input object template image, said first input object template image associated with a first type of input object; and
in response to a sufficient correlation between said capacitive image and said first input object template, determining a location of said first type of input object with respect to said sensor.

16. The processing system of claim 15, wherein said processing system is further configured to:
select an input mode from the group of input modes consisting of: a hovering human digit input mode, a contacting human digit input mode, and a stylus input mode.

17. The processing system of claim 15, wherein said processing system is further configured to:
filter said capacitive image to obtain a filtered capacitive image, wherein the processing system compares said first input object template image with a part of said filtered capacitive image.

18. The processing system of claim 17, wherein said processing system being configured to filter said capacitive image to obtain a filtered capacitive image comprises:
said processing system being configured to employ a matched filter on said capacitive image to obtain said filtered capacitive image.

19. The processing system of claim 17, wherein said processing system being configured to filter said capacitive image to obtain a filtered capacitive image comprises:
said processing system being configured to:
estimate spatially correlated noise with respect to a portion of said capacitive image; and
remove said spatially correlated noise from said portion of said capacitive image to obtain said filtered capacitive image.

20. The processing system of claim 17, wherein said processing system being configured to filter said capacitive image to obtain a filtered capacitive image comprises:
said processing system being configured to:
filter said capacitive image to determine an input object presence probability in at least one particular location in said capacitive image; and
in response to said input object presence probability exceeding a threshold for said particular location, establish a portion of said capacitive image, including said particular location, as said part of said capacitive image which is compared with said first input object template image.

* * * * *